US006374375B1

(12) United States Patent
Yip et al.

(10) Patent No.: US 6,374,375 B1
(45) Date of Patent: *Apr. 16, 2002

(54) MONITORING LINE CONDITIONS IN THE DATA TRANSMISSION MODE

(75) Inventors: Philip C. Yip; Muhammad M. Rahmatullah; Terry L. Cole, all of Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,300

(22) Filed: May 9, 1997

(51) Int. Cl.[7] .............................................. G01R 31/28
(52) U.S. Cl. ...................................... 714/715; 375/231
(58) Field of Search ........................... 714/715; 463/41; 455/557; 375/295, 222, 231, 224, 219, 377; 379/93.1; 370/231, 236, 468, 282; 358/1.18, 1.1

(56) References Cited

U.S. PATENT DOCUMENTS

| 4,792,940 A | | 12/1988 | Hiraguchi | 370/292 |
|---|---|---|---|---|
| 4,849,989 A | * | 7/1989 | Kamerman | 375/231 |
| 4,956,851 A | * | 9/1990 | Wolensky et al. | 375/222 |
| 5,214,637 A | * | 5/1993 | Sridhar et al. | 370/286 |
| 5,408,475 A | | 4/1995 | Lee | 714/715 |

OTHER PUBLICATIONS

CHAME(A Digital Signal Processor Yields Enhanced Data/Fax Pump; IEEE, Feb. 1997).*
Parizhsky et al. (Simplified trellis decoder; IEEE, Aug. 1996).*
Noble et al.(The viability of very high data rate modems for a specific HF channel type; IEEE, Jul. 1997).*
ITU–T Recommendation V.8(09/94) "Procedures For Starting Sessions Of Data Transmission Over The General Switched Telephone Network"; pp. 1–10.
ITU–T Recommendation V.32 (03/93) "A Family Of 2–Wire, Duplex Modems Operating At Data Signalling Rates Of Up To 9600 bit/s For Use On The General Switched Telephone Network And On Leased Telephone–Type Circuits"; Pp. 1–23.
CCITT Recommendation V.32 bis (02/91) "A Duplex Modem Operating At Data Signalling Rates Of Up To 14 400 bit/s For Use On The General Switched Telephone Network And On Leased Point–To–Point 2–Wire Telephone–Type Circuits"; pp. 1–22.
ITU–T Recommendation V.34 (09/94) "A Modem Operating At Data Signalling Rates Of Up To 28 800 bit/s For Use On The General Switched Telephone Network And On Leased Point–To–Point 2–Wire Telephone–Type Circuits"; Pp. 1–63.
CCITT Recommendation V.42 bis (01/90) "Data Compression Procedures For Data Circuit Terminating Equipment (DCE) Using Error Correction Procedures"; pp. 1–27.

* cited by examiner

Primary Examiner—Albert DeCady
Assistant Examiner—Guy J. Lamarre
(74) Attorney, Agent, or Firm—Skjerven Morrill MacPherson, LLP; Stephen A. Terrile

(57) ABSTRACT

A method and apparatus for allowing a modem transmitting data in the data mode to initiate retraining mode due to changing line conditions. The modem inserts a test signal within the data received from a computer system. The data and test signal are encoded and sent over a network to a second modem. The second modem compares the test signal with a standard test signal, and if the test signal received is different from the standard test signal, the second modem initiates retraining of the modems to adjust for the varying line conditions.

52 Claims, 6 Drawing Sheets

MONITORING LINE CONDITIONS IN THE DATA TRANSMISSION MODE

BACKGROUND OF THE INVENTION

1. Field of the Invention

The present invention relates to a modem, and more particularly, to a method and apparatus for monitoring the line conditions between modems transmitting data in the data mode.

2. Description of the Related Art

A modem is a signal converting device that allows a computer system to communicate with other computer systems or other electronic systems over a network such as a telephone network. Because telephone systems were originally designed to carry modulated analog voice signals, today's telephone networks do not allow direct digital current signals to pass between computer systems. Thus, a modem can be used to convert the direct current pulses of the digital code from the computer system to an analog signal that is capable of being transmitted over a telephone network.

Uniform modem operating standards allow computer systems to communicate with each other over a world-wide telephone network. One organization for setting such standards is the International Telecommunications Union Telecommunications Standards Sector (ITU-T), a United Nations organization formerly known as the Comité Consultatif International Telegraphique et Téléphonique (CCITT). Over the years, the standards established by ITU-T have improved in the amount of data that can be transferred over a telephone network in a given period of time. An earlier ITU-T standard, V.22, allows a transfer rate of 1200 bits per second (bps). The V.32 standard allows a data transfer rate of up to 9600 bps. The V.32bis standard extends the V.32 standard to 14,400 bps. Under the V.34 standard, modems can transfer data at rates as high as 28,800 bps.

A connection between two modems over a computer network is established by a call progressing protocol or startup procedure. After dialing the answering modem and receiving a ringing tone, the calling modem assumes that a connection is made with the answering modem if no busy signal is received from the answering modem. The calling modem then sends out various tones at different frequencies and adjusting signals to the answering modem. The answering modem analyzes the received tones and signals to determine the conditions of the line. Similarly, the answering modem sends out the same type of tones and signals as well. During these training phases, both modems adjust their channel compensation modules to compensate for or adjust to the conditions of the telephone network. When the channel compensation modules are well trained, or set for the maximum amount of data transfer, the modems then proceed into the data mode where data from the computer systems can be transferred between the modems over the telephone network.

One problem in transmitting data over the telephone network is that changing line conditions in the telephone network decrease the amount of data that can be transferred over a given period of time. Some of these conditions include cross talking, interference from other sources such as power lines, and changing weather conditions.

In order to compensate for changing line conditions, the channel compensation modules need to be reset or retrained. Retraining is invoked when one of the modems detects an unsatisfactory signal reception or detects a certain tone signal from the other modem. However, the approach of waiting until line conditions become unsatisfactory can delay entering the retraining mode. During such a delay, the line conditions may change so rapidly as to cause a disconnection between the two modems. A disconnection requires a computer system to redial the other modem and reestablish a connection. Besides the extra time involved, some computer network providers charge a fee for the initiation of a new call. Furthermore, in some high traffic areas such as a popular internet site, reestablishing a connection may take several minutes if not hours.

Some past methods for detecting unsatisfactory signal reception include implementing CRC error correction which requires that the modems be compatible with the V.42 standard and monitoring the average noise of a connection for a given period of time which requires additional hardware in the modem.

What is needed is a method to monitor the line conditions in the data mode which is simple, independent, and transparent.

The ITU-T Recommendation V.34 (V.34 standard) is hereby incorporated by reference in its entirety.

SUMMARY OF THE INVENTION

It has been discovered that transmitting and monitoring a test signal in the data mode provides a method for a modem to monitor changing line conditions in the data mode.

More specifically, in one aspect of the present invention, a method for transmitting data over a network includes transmitting data over the network by a first modem. The data including a test signal. The method further includes receiving the test signal from the network by a second modem, comparing the test signal received by the second modem to a standard test signal, and selectively initiating retraining as determined by the comparison.

In another aspect of the invention, a modem includes a receiver for receiving signals from a network. Wherein in a first mode, the signals contain a first plurality of data originating from a computer system coupled to the network. The signals also include a first test signal within the first plurality of data. The receiver further includes a channel compensation module. The channel compensation module altering the signals received from the network to adjust for at least one condition of the network. The channel compensation module altering the signals as per a set of parameters. The set of parameters are reset as determined by a result of the receiver comparing the first test signal to a standard test signal.

Transmitting and monitoring a test signal in the data mode advantageously provides a way for the modem to monitor changing line conditions in the data mode that is simple, transparent and independent. Changing line conditions can be monitored with out noise averaging equipment or without the modems being compatible with the V.42 standard.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
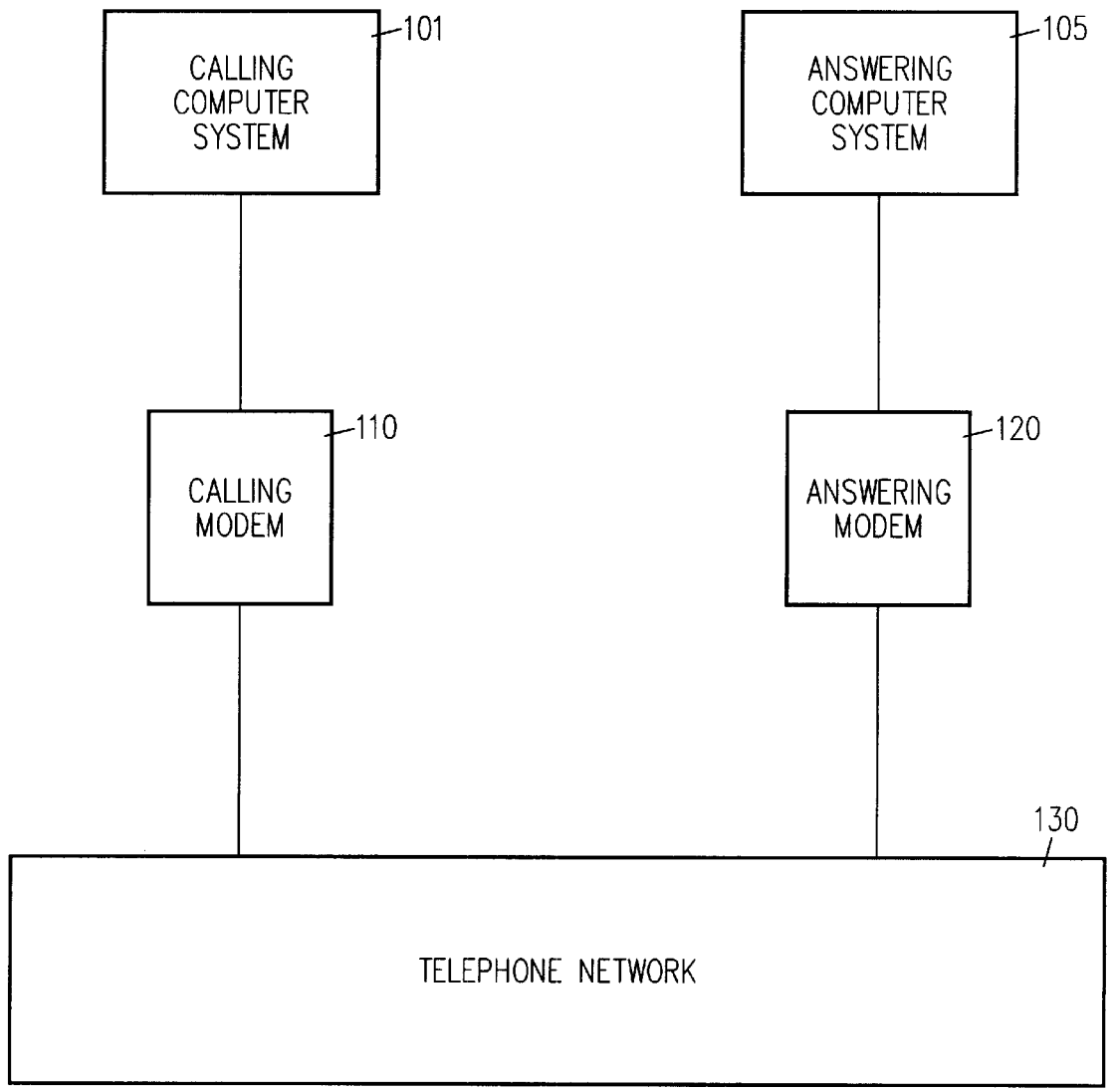
FIG. 1 is a block diagram of a two computer system implementing the present invention over a telephone network.

FIG. 1 shows a block diagram of two computers exchanging information over a telephone network via two modems. Calling computer system 101 is connected to a calling modem 110. Answering computer system 105 is connected to an answering modem 120. In the embodiment shown, the designation of "calling" and "answering" is for identification purposes with respect to a single call described below. The answering modem 120 may also be capable of calling the calling modem 110. The modems 110 and 120 are connected through a telephone network 130. Telephone network 130 includes several links and switches between the two modems. The differences in transmission characteristics of the individual links can cause problems in transferring data between computer system 101 and computer system 105. In some embodiments, the telephone network may include single pair cable. In other embodiments, some of links in the telephone network 130 may include fiber optic cable. These links have different transmission characteristics which may change during a telephone connection between the calling modem 110 and the answering modem 120.

To transfer data between the calling computer system 101 and the answering computer system 105, the calling computer system instructs the calling modem 110 to dial the answering modem 120 via the telephone network 130.

Figure 2A:
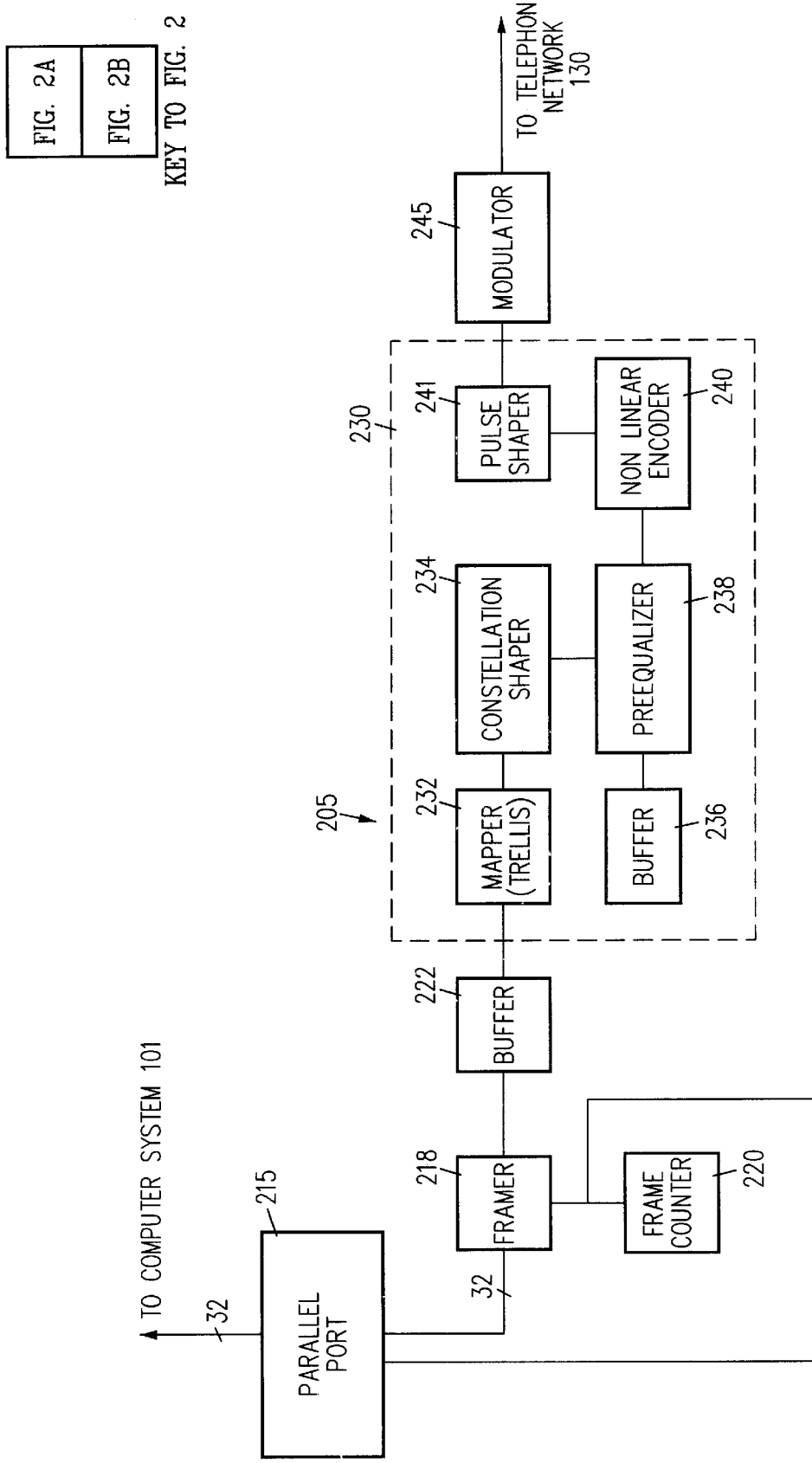
FIG. 2 is a block diagram of a modem implementing the present invention.
Figure 2B:
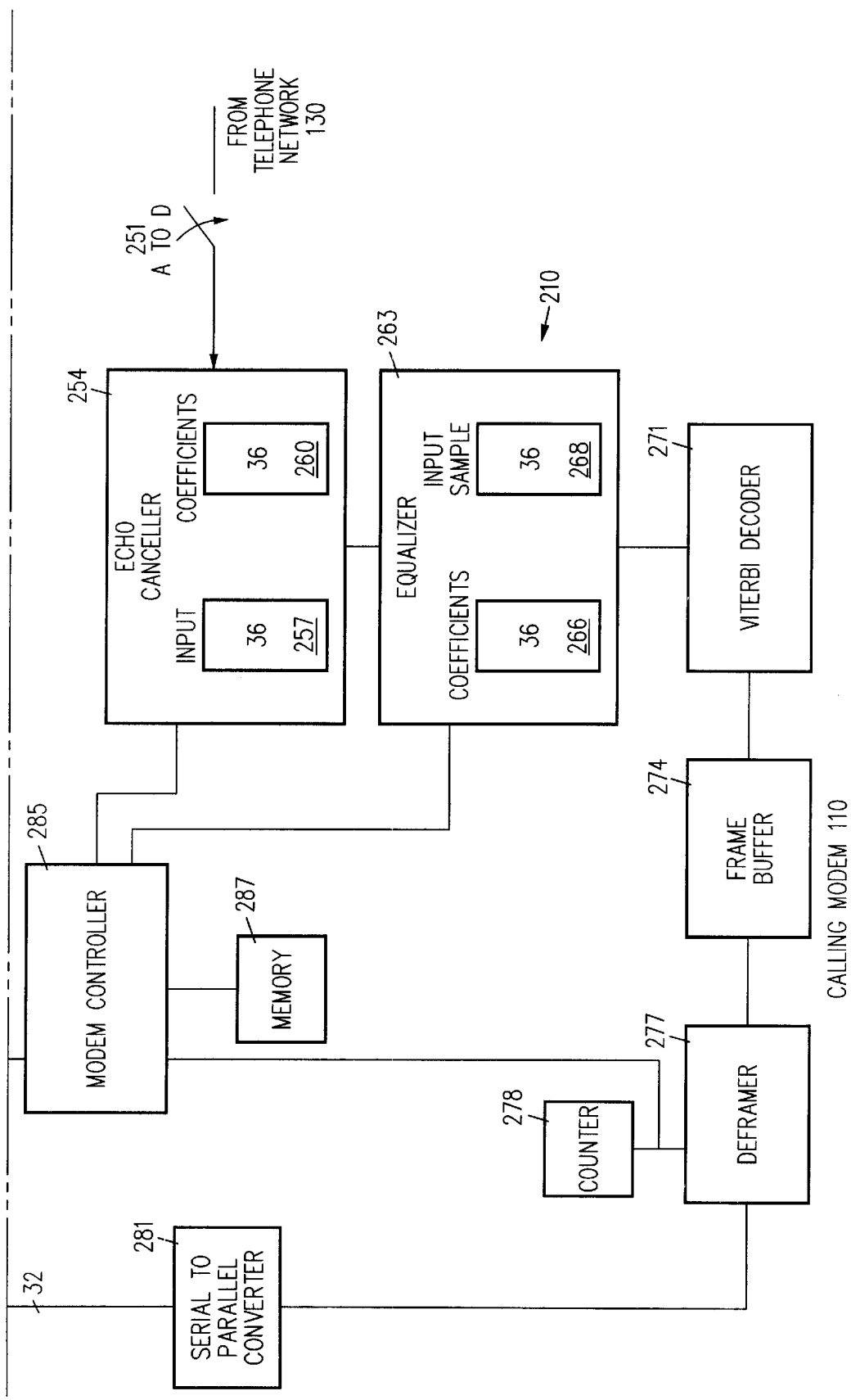

FIG. 2 shows a block diagram of one embodiment of the calling modem 110. In the embodiment shown, the modem includes a modem controller 285 with attached memory 287. The modem controller 285 controls the operation of the modem 110. The program used to control the modem is stored in memory 287. In one embodiment, the program is written in the C++ computer language. In other embodiments, the program is implemented using a digital signal processor.

The calling modem 110 has a parallel port 215 for receiving data from the computer system 101. In the embodiment shown, the parallel port is 32 lines wide. In other embodiments, the width of the data lines may vary. In some embodiments, the modem 110 may receive data from the computer system 101 through a serial line.

The framer 218 is connected to the parallel port 215 via a 32 bit wide data line. In one embodiment, framer 218 is an I/O register that is controlled by the modem controller 285 and receives the data in parallel from the computer system 101. The modem controller 285 reads the I/O registers of the framer 218 and runs a routine to pack the data bits into frames of data. Framing bits are also added to each frame. In the embodiment shown, the frames consist of 72 bits of data from computer system 101. However, the number of bits per frame may vary. The framed data is then written into a frame buffer 222 where afterwards it is encoded into signals by the encoder 230 and modulated over the telephone network 130.

The modem controller 285 also runs a test signal insertion program where a test signal is inserted into a data frame by the framer 218. This test signal is used by the answering modem 120 to monitor network line conditions in the data mode. In the embodiment shown, the test signal is a sequence of 8 bits represented by 01010101. These bits are inserted periodically into the last 8 bits of every Nth number of data frames. For a data rate of 28.8 kilobits per second (kbps), the test sequence is inserted into the last eight bits of every 400th frame. In other embodiments, a maximum length, pseudo random sequence can be used as the test signal.

In other embodiments, frame counting is performed by a separate frame counter 220. Also in other embodiments, the framer 218 includes a separate controller (not shown) for controlling the operations of the framer 218.

After the data has been framed, it is sent to an encoder 230 where the data is encoded into signals to be sent over a telephone network. In the embodiment shown, the encoder 230 is a V.34 encoder that encodes the signals according to the V.34 algorithm. Encoder 230 includes several modules such as a mapper 232, a constellation shaper 234, a pre-equalizer 238 with an associated buffer 236 for holding the coefficients of the pre-equalizer, a non linear encoder 240, and a pulse shaper (preemphasis filter) 241. The mapper 232 maps the data bits to signal points in a multi-dimensional signal constellation. A constellation shaper 234 performs a method for improving noise immunity by introducing a non-uniform, two dimensional probability distribution for transmitted signal points. The pre-equalizer 238 shapes the signal to be transmitted to compensate for amplitude distortion caused by the telephone network. The buffer 236 contains the coefficients used in the pre-equalization process. The non linear encoder 240 improves distortion immunity near the perimeter of a signal constellation by introducing a non-uniform, two-dimensional signal point spacing. The pulse shaper 241 improves dispersion or distortion by introducing a non uniform probability distribution for transmitting signal points. A bit scrambler (not shown) may also be included in the V.34 encoder. The functions of the encoder 230 may be performed by various hardware or may be performed partially by the controller 285. The parameters or coefficients used by these modules may be adjusted or reset during retraining.

After the data has been encoded, the data is then modulated at a carrier frequency by the modulator 245 and transmitted over the telephone network 130.

The calling modem 110 includes a receiver 210 for receiving computer data from computer system 105 via the telephone network 130. The received signal is first digitized by the analog to digital converter 251. Afterwards, the digital signal is sent to the echo canceller 254. The echo canceller 254 is a compensation module that includes input buffer 257 and a coefficient buffer 260. The purpose of the echo canceller 254 is to remove the component of the received signal that is due to the echo of the signal sent by the transmitter 205 of modem 110. One of the primary causes of the echo is impedance mismatches in the telephone network 130. The echo canceller 254 removes the portion of the received signal according to the coefficients stored in buffer 260. The coefficients for a given network connection are determined during the training of the echo canceller that occurs in the startup procedure (See FIG. 3). During phase three, a test signal is sent out by the transmitter 205. By use of this test signal, the echo patterns of the network connection are determined.

Figure 3:
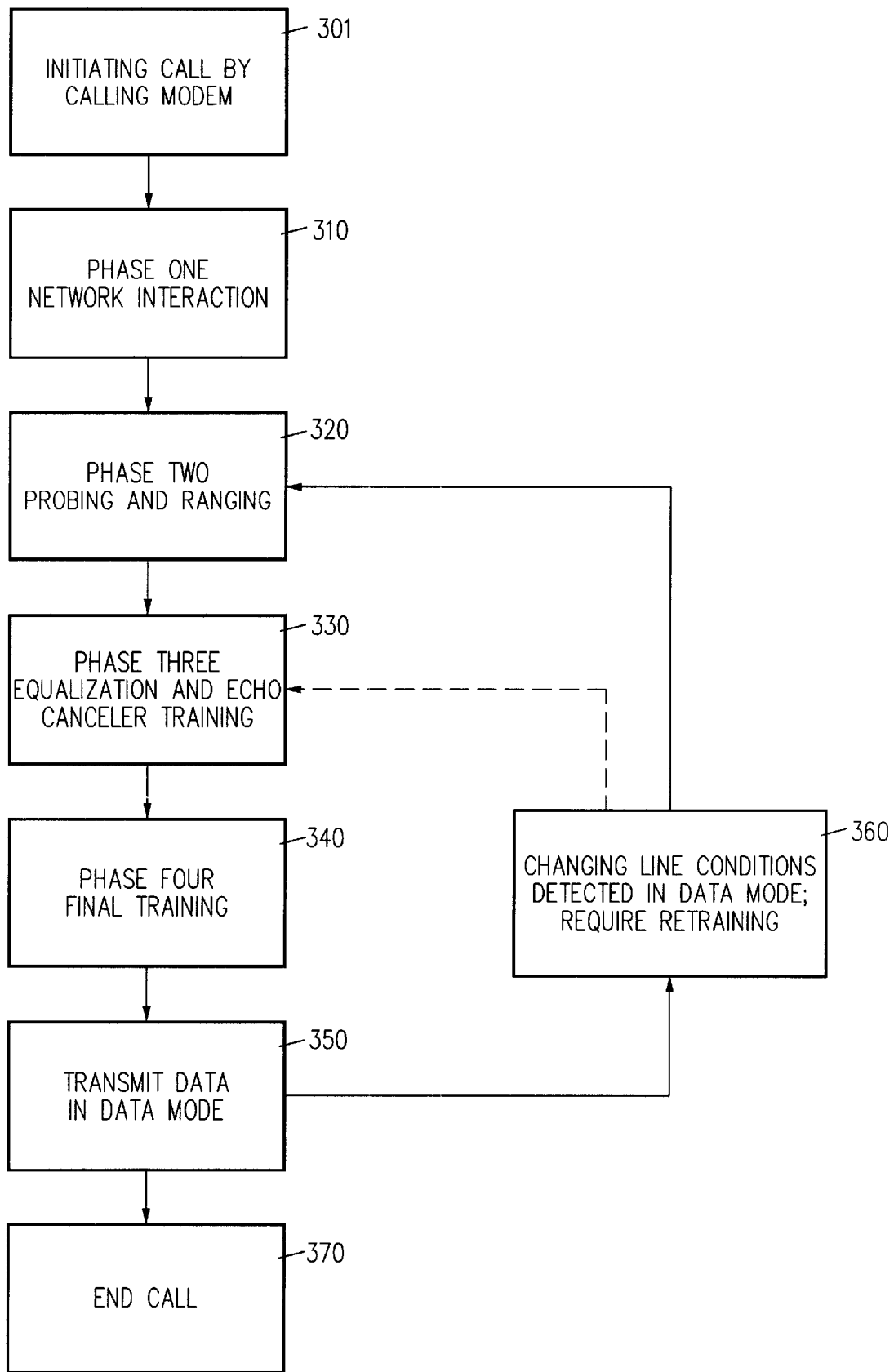
FIG. 3 is a flow diagram of an embodiment of the present invention.

After the echo canceller 254, the received signal is sent to another compensation module, the equalizer 263. The equalizer 263 compensates for the dispersive effects of the telephone network 130. The equalizer 263 includes a buffer 266 for holding the coefficients used in the equalization process. These coefficients control the amount of adjustment made to the received signal input samples held in buffer 268 by the equalizer 263. These coefficients are determined during the training of the equalizer 263 which occurs during the startup sequence as shown in FIG. 3. In equalizer training, signals are sent by each modem 110 and 112. Those signals are received by the corresponding modem and are used to determine the coefficients for optimum transmission.

After equalization, the received signal is sent to decoder 271. Decoder 271 converts the signals from the telephone network that have been digitized and altered by the echo canceller 254 and equalizer 263 and converts those signals into frames of data. Afterwards, the frames are sent to a frame buffer 274 which stores the frames until they are sent to the deframer 277. In the embodiment shown, the decoder 271 is a Viterbi decoder which decodes the received signals according to the V.34 algorithm. In the embodiment shown, decoder 271 includes three different individual decoders. Any one of the three can be used at one time in the receiving of data. Which of the three decoders to be used during the transmission of data is determined in the training phases.

The deframer 277 receives the data frames from the frame buffer 274 and enables the frames to be unpacked where the framing bits and the test sequence bits are removed from the computer data. The resulting data is sent to the serial to parallel converter 281. The output of the converter 281 is sent to the computer system 101 via parallel port 215.

In the embodiment shown, deframer 277 is an I/O register controlled by the modem controller 285. The controller 285 runs a program that removes the framing bits and test sequence bits from the data frames. In addition, the controller 285 also runs a program that uses the test signal to determine if the modem needs to be retrained due to varying network conditions. In the embodiment shown, the modem counts the number of frames received by the deframer 277. Upon counting the Nth number of frames (or 400th frame for a data rate of 28.8 kbps), the controller 285 reads the last 8 bits of that frame and compares them to a standard 8 bit test sequence located in the controller memory 287 or alternatively, located in a register (not shown). If the 8 bits received do not match the standard 8 bit sequence in memory 287, controller 285 initiates modem retraining (See FIG. 3).

In an alternative embodiment, the comparing of the test signal to the standard test signal may be performed by other hardware. In another embodiment, the deframer 277 includes a counter 278 that counts the number of frames being unpacked. When the counter reaches the Nth frame, the last 8 bits of a frame are latched in a register. The 8 latched bits are then compared with the standard 8 bit sequence located in another register to determine it the modem needs to be retrained.

FIG. 3 is a flow diagram for a data transmission session between two modems. In the embodiment shown and described, the modems transmit data according to the V.34, full duplex standard. The signals transmitted during the startup procedure are more fully described in the V.34 standard. However, the illustrative monitoring technique may be employed with other standards for data transmission over a telephone network.

In operation 301, the calling modem 110 initiates the session by dialing the receiving modem 120 through the telephone network 130. In phase one 310, the modems 110 and 120 transmit and receive initial signals. In phase two 320, probing and ranging are performed (see FIG. 4). In phase three 330, the calling modem 110 and the answering modem 120 perform echo canceller and equalizer training (See FIG. 5). In phase four step 340, final training of the modems is performed along with an exchange of modulation parameter (MP) signals (See FIG. 5).

After phase four 340, the modems 110 and 120 enter the data mode 350 where the modems exchange data from the computer systems 101 and 105. In the data mode, a test signal is sent with the computer data. If one of the modems does not receive the test signal, that modem assumes that the line conditions have changed enough that the echo canceller 254, the equalizer 263, and other channel compensation modules require retraining. The modem which does not receive the test signal then initiates retraining. To retrain, the modems cease transmitting data and return to an earlier phase of the startup procedure. In one embodiment, the modems return to phase two 320 (See FIG. 4) for full retraining where parameters or coefficients used by the modules of encoder 230 are reset or readjusted as well as the parameters or coefficients of the echo canceller 254 and equalizer 263. In an alternative embodiment, the modems return to phase three where the echo canceller 254 and equalizer 263 parameters or coefficients are reset or readjusted. In another embodiment, upon determining that the line conditions have changed, the modems return to phase three and proceed via phase four 340 to transmit data in the data mode in operation 350. If the modems do not receive the test signal at this point, then the modems will proceed to phase two 320 for full retraining.

In phase one 310, the calling modem 110 sends a function indicator signal or call indicator signal (CI) to the answering modem 120. The CI signal indicates to the answering modem 120 that the calling modem 110 wishes to establish an exchange of data between the two modems. Initially, the calling modem 110 conditions its receiver to detect either answer tone signals ANS or ANSam.

After the connection is established, the answering modem 120 is silent for a momentary period. After receiving the CI signal from the calling modem 110, the answering modem 120, in the embodiment shown, sends an answer tone (ANS) signal to the calling modem 110. After receiving the answer tone ANS, the calling modem 110 conditions its receiver 210 to detect a joint menu (JM) signal from the answering modem 120. The calling modem 110 sends a call menu (CM) signal to the answering modem 120 with the appropriate modulation mode bits set to indicate that the V.34 standard is desired to be used. Upon receiving the minimum of the two CM signal sequences where modulation mode bits indicate V.34 standard of data transmission is desired, the answering modem 120 sends the JM signal and conditions its receiver to detect a CM terminator (CJ) signal. After a minimum of two identical JM signals have been received from the answering modem 120, the calling modem 110 completes the CM octet and sends a CJ signal, followed by a transmission of silence for a predetermined period of time. The calling modem 110 then proceeds to phase two 310. After receiving all of the octets of the CJ signal, the answering modem 120 transmits silence for a predetermined period and proceeds to phase two.

Figure 4:
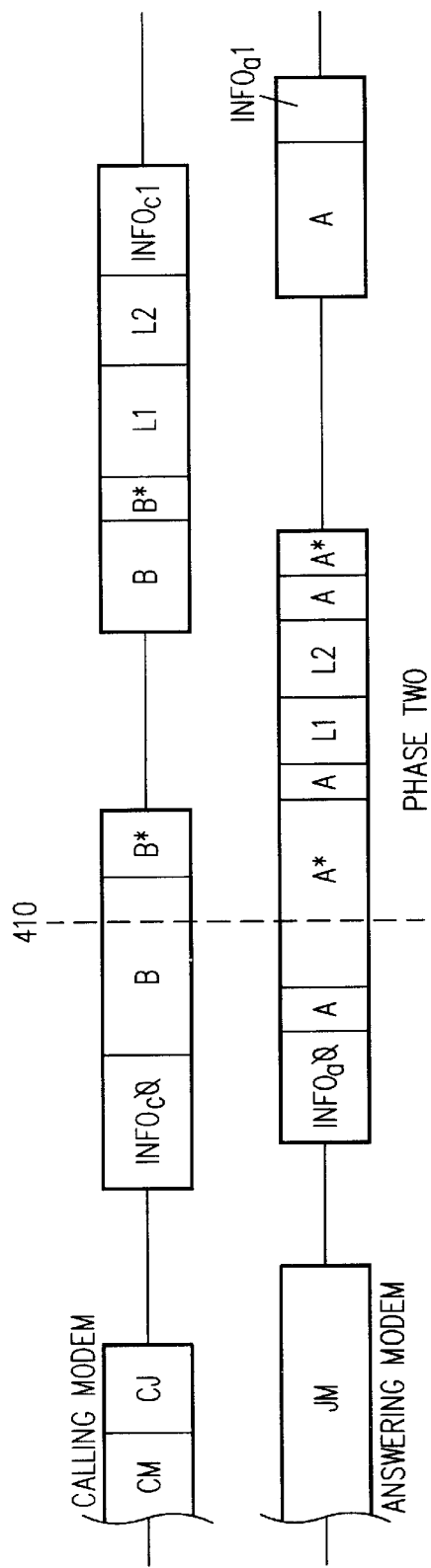
FIG. 4 is a timing diagram showing phase two of a startup procedure.

Referring to FIG. 4, in phase two (step 320), network channel probing and ranging are performed. The modems exchange capabilities information and modulation parameters in signals called INFO sequences. The calling modem 110 sends a first information sequence (INFOc0). The answering modem 120 then sends a first information sequence (INFOa0). The calling modem 110 and answering modem 120 then exchange tones for predetermined periods of time to determine the time needed to transmit between the two modems. The calling modem 110 sends a tone at 1200 Hz (tone B) and then the answering modem 120 responds with tone at 2400 Hz (tone A). Upon receipt of the tone A and a predetermined delay, the calling modem 110 transmits a 180 degree phase reversal of tone B (B*). After receiving the tone B* and waiting for a predetermined delay, the answering modem 120 transmits tone A.

In phase two 320, the modems also exchange line probing signals L1 and L2. These probing signals are used to analyze the characteristics of the channel. Referring again to FIG. 4, after sending the second tone A signal, the answering modem 120 sends the L1 signal for a predetermined period followed by the L2. During most of the time that the answering modem 120 is sending the L1 signal, the calling modem 110 transmits silence. After sending the tone B and tone B* signals, the calling modem 110 then sends the L1 and L2 signals to the answering modem 120. During the majority of the sending of the L1 signal, the answering modem 120 transmits silence. After the calling modem 110 detects the tone A signal, the calling modem 110 sends a second information sequence (INFOc1). After receiving INFOCc1, the answering modem 120 sends its second information sequence (INFOa1). After a period of silence, both modems proceed to phase three. It is understood, that if problems develop in the signal exchange during phase two or any other phase during the startup procedure, the V.34 standard includes procedures for handling those conditions.

Figure 5:
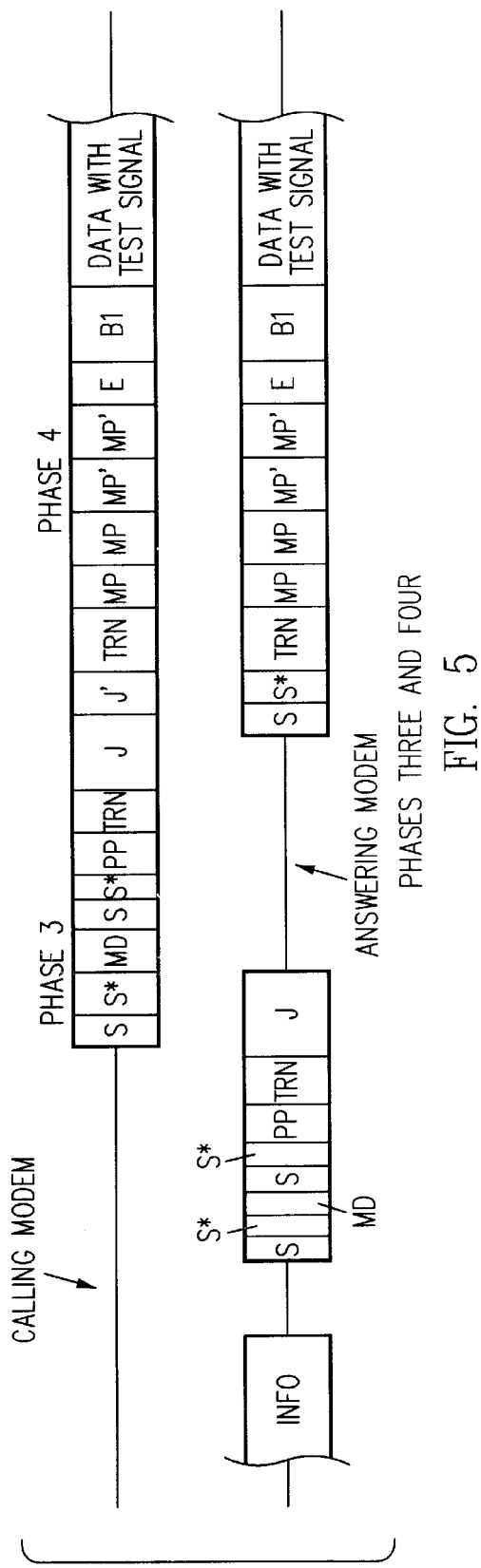
FIG. 5 is a timing diagram showing phases three and four of a startup procedure.

Referring to FIG. 5, in phases three and four (steps 330 and 340), equalizer and echo canceller training are performed by both the calling modem 110 and the answering modem 120.

In phase three 330, the answering modem 120 sends an S signal for a predetermined period of time and then sends an S* signal. Signals S and S* are alternating signals of a point on a super constellation. The answering modem 120 then sends a Manufacturer-Defined (MD) signal to the calling modem 120. The MD signal is an optional signal used by a transmitting modem to train its echo canceller if training can not be accomplished by the TRN signal in phase three. In one embodiment, the specific bits in the MD signal inform the answering modem 120 that the calling modem 110 has the ability to implement the monitoring technique and that the calling modem 110 will be sending a test signal during every Nth number of frames in the data mode. The length of the MD signal is indicated in the answering modem's 120 second INFOa1 sequence in phase two. However, in other embodiments, the modems may signal to each other the ability to implement the monitoring technique with other signals such as the first and second INFO sequences. After sending the MD signal, the answering modem 120 transmits the S and S* signals again.

After the second transmission of the S and S* signals, the answering modem 120 sends a PP tone signal which consists of six periods of a 48-symbol sequence and is used by the calling modem 110 for training its equalizer 263 and used by the answering modem 120 for training its echo canceller. The calling modem 110 receives the PP signal and, in response, determines coefficients for its equalizer 263.

After sending the PP signal, the answering modem 120 sends a TRN signal for a predetermined period of time. The TRN signal is a sequence of symbols generated by applying binary ones to the input of a scrambler (not shown). The calling modem 110 uses the TRN signal to further train the equalizer 263.

After sending the TRN signal, the answering modem 120 sends a J signal which indicates the constellation size (number of symbols) used by the calling modem 110 for transmitting the TRN signal, the modulation parameters signal (MP), the modulation parameters MP' signal, and the E signal during phase four 350.

After receiving the J signal, the calling modem 110 waits for a predetermined period of time and then transmits the S and S* signals to be received and used by the answering modem 120 in training its equalizer. The calling modem 110 then transmits the MD signal informing the answering modem 120 of the calling modem's capability to send a test signal in the data mode and that it will be implementing this feature. Upon receipt of the MD signal from the calling modem 110, the answering modem 120 will also condition itself to use the test signal feature. To implement the test signal feature, both modems 110 and 120 enable their framers 218 to insert the test signal in the data to be transmitted and enable their deframers 277 to detect the test signal in the received data.

After sending the S and S* signals for a second time, the calling modem 110 sends a PP followed by a TRN signal which is used by the answering modem 120 in training the equalizer and setting equalizer coefficients and used by the calling modem 110 in training its echo canceller 254. After sending the TRN signal, the calling modem 110 sends the J signal and conditions its receiver 205 to detect the S signal.

Upon receiving the J signal and waiting a predetermined amount of time, the answering modem 120 sends the S signal again and proceeds to the final training in phase four (step 340). Upon receipt of the S signal, the calling modem 110 proceeds to phase four.

In phase four (step 350), the modems exchange the final data mode modulation parameters (MP). After detecting the S signal and following S* signal, the calling modem 110 ceases to send the J signal. The calling modem 110 conditions its receiver to detect the TRN signal and then transmits one J' signal and a TRN signal. After transmitting the TRN signal for a predetermined period of time, the calling modem 110 conditions its receiver to detect the MP signal and continues to send the TRN signal. Afterwards, the calling modem 110 sends an MP signal.

The MP signal is used by the calling and answering modems to exchange modulation parameters including data rates to be used for data mode transmissions. The modems determine the interval number of frames in which the test signal is to be inserted based on the information sent in the MP signals.

After sending the S signal for a predetermined period of time, the answering modem 120 sends the S* signal followed by the TRN signal. After receiving the TRN signal from the calling modem 110, the answering modem 120 conditions its receiver to receive the MP signal. After sending the TRN signal, the answering modem 120 then sends a MP signal to the calling modem 110.

The calling and answering modems continue to send MP signals until they receive an MP signal from the other modem. Upon receiving the MP signal from the other modem, the transmitting modem sends an MP' signal. The MP' signal is an MP signal with the acknowledge bit sent to one. Each transmitting modem continues to send the MP' signals until it receives an MP' signal from the corresponding modem. Afterwards, both modems send an E signal or sequence. After receiving each other's E signal, each modem knows the data signaling rates in both directions.

After sending the E signal, each modem conditions its receiver to receive a B1 signal from the corresponding modem and then sends its own B1 signal. The B1 signal includes a single data frame of scrambled ones encoded at the selected data mode modulation parameters. The B1 signal is used for synchronization.

In one embodiment, the B1 signal does not include the test signal. In another embodiment, the B1 includes the test signal. In this second embodiment, the B1 signal serves as the beginning frame to start counting the number of frames between the insertion of the test signals. In another embodiment, each modem has the option of sending the test signal in the B1 signal. If one of the modems has not received the test signal in the B1 signal from the other modem, then neither modem will implement the test signal feature during data transmission.

After receiving the B1 signal from the corresponding modem, each modem begins transmitting computer data in the data mode. In the data mode of the embodiment shown, the test signal is included in the last 8 bits of every Nth data frame.

Figure 6:
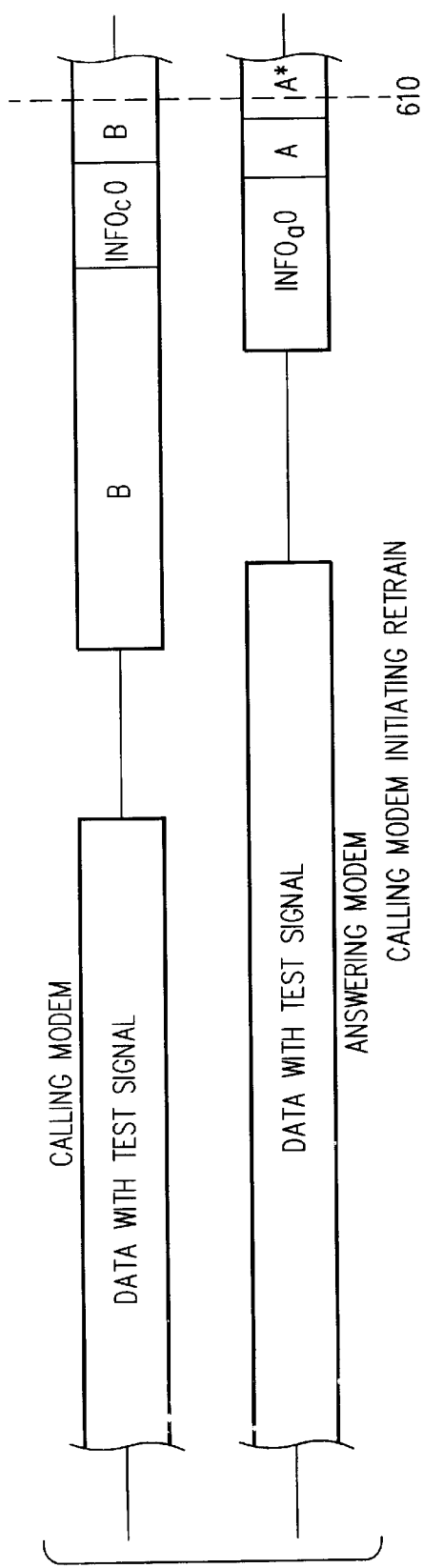
FIG. 6 is a timing diagram showing timing signals of the calling modem initiating the retraining of the modems.
Figure 7:
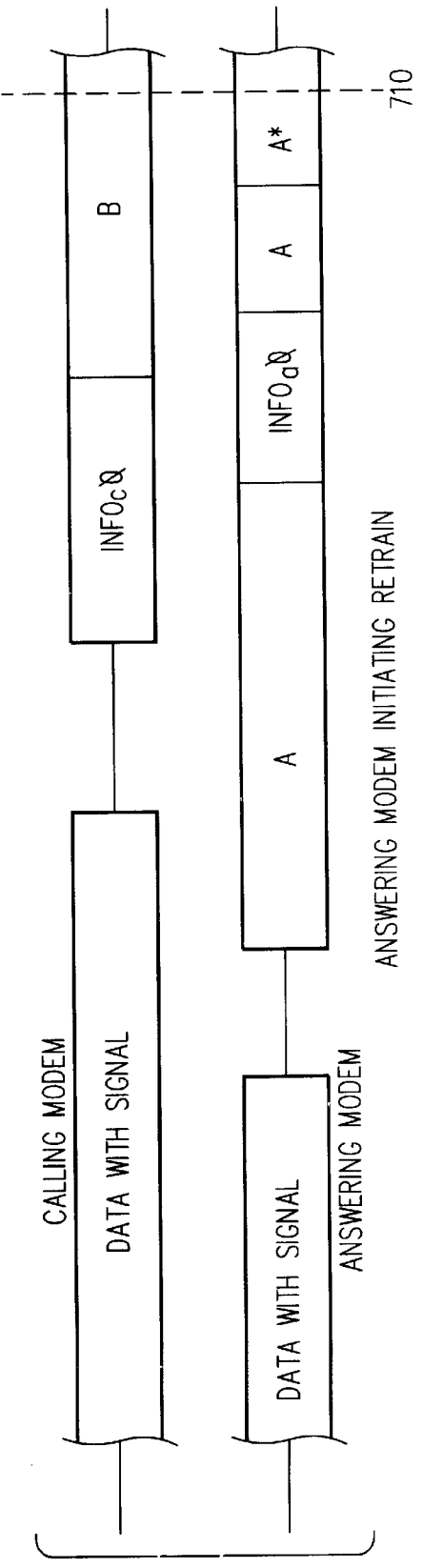
FIG. 7 is a timing diagram showing timing signals of the answering modem initiating the retraining of the modems.

Referring to FIGS. 6 and 7, if either modem fails to detect the test signal sent by the corresponding modem during the transmission of data in the data mode, that modem failing to detect the test signal ceases transmitting data. Upon a consecutive failure to receive the test signal, that modem initiates retraining. FIG. 6 shows the timing diagram where the calling modem 110 has initiated retraining. The calling modem 110 stops sending data after failing to detect the test signal from the answering modem 120 in the Nth frame. After failing to detect a second consecutive test sequence, the calling modem 110 transmits the tone B signal and conditions its receiver 205 to receive the INFOa0 signal. Upon receiving the tone B signal, the answering modem 120 stops transmitting data and transmits the INFOa0 signal. Afterwards, the answering modem 120 transmits the A and A* signals. After transmitting the INFOc0 signal, the calling modem transmits the tone B signal. At this point 610, the retraining procedure continues accordingly from time 410 of phase two of the startup procedure as shown in FIG. 4.

FIG. 7 shows the answering modem 120 initiating the retraining of the modems. After failing to detect a test signal from the calling modem 110 in the Nth frame, the answering modem 120 transmits silence and waits for the second test signal. Upon failing to receive a second test signal, the answering modem 120 initiates retraining by transmitting the tone A signal and conditions its receiver to receive the INFOc0 signal. Upon receiving the tone A signal, the calling modem 110 transmits the INFOc0 signal. Upon receiving the INFOc0 signal, the answering modem 120 then transmits the INFOa0 signal. After transmitting the INFOc0 signal, the calling modem 110 transmits the tone B signal. After receiving the tone B signal, the answering modem 120 transmits the tone A signal followed by the tone A* signal. At this point 710, the retraining procedure continues accordingly from time 410 of phase two of the startup procedure as shown in FIG. 4.

In other embodiments, the INFOa0 and INFOc0 are not transmitted during retraining.

During the retraining procedure, the modems proceed again through phases two, three, and four (see FIGS. 4 and 5). The parameters or coefficients in the channel compensation modules established or set during the start up procedure are cleared, and new parameters or coefficients are determined and stored in the appropriate buffers.

In an alternative embodiment, upon a failure to detect the test signal, either modem can initiate retraining by returning to phase three (See FIG. 5) where the echo canceller and equalizer are retrained. To initiate retraining that starts at phase three 330, the initiating modem transmits the S signal followed by an S* signal (See FIG. 5). If after proceeding through retraining initiated from phase three, one of the modems still does not receive the test signal, then that modem will initiate retraining and return to phase two by transmitting the A or B signal depending on which modem is initiating retraining.

After all of the data has been transferred between the modems, either modem may terminate the call by transferring an end command transfer signal in step 370.

OTHER EMBODIMENTS

While the present invention is describe as being implemented in a full duplex, V.34 standard, the present invention can also be implemented in other data transferring standards and algorithms that transmit data in a frame structure.

The present invention may also be implemented in networks or data transferring systems, other than telephone networks, where data can be transferred in a frame structure.

While particular embodiments of the present invention have been shown and described, it will be obvious to those skilled in the art that changes and modifications may be made without departing from this invention and it's broader aspects and, therefore, the appending claims are to encompass within their scope all such changes and modifications as all within the true spirit and scope of this invention.

What is claimed is:

1. A method for use with modems having start-up modes and data modes consistent with ITU-T Recommendation V.34, A Modem Operating At Data Signaling Rates Up To 28800 Bit/S For Use On The General Switched Telephone Network And On Leased Point-To-Point 2-Wire Telephone-Type Circuits (V.34 Specification), said method comprising:

transmitting data over the network by a first modem in data mode, the data including a test signal;

receiving the test signal from the network by a second modem in data mode;

comparing the test signal received by the second modem in data mode to a standard test signal; and selectively initiating retraining as determined by the comparison of the test signal received by the second modem in data mode.

2. The method of claim 1, wherein the first modem transmits the test signal at predetermined intervals during the transmitting of the data.

3. The method of claim 1 further comprising:

transmitting an information signal over the network by the first modem, the information signal indicative that the first modem is capable of transmitting a test signal;

receiving the information signal from the network by the second modem; and transmitting a second information signal over the network by the second modem, the second information signal indicative that the second modem is capable of comparing the test signal with a standard test signal.

4. The method of claim 3 wherein the information signals are transmitted over the network during a phase three of a startup procedure.

5. The method of claim 3 wherein:

the transmitting the information signal over the network by the first modem further includes transmitting a Manufacture Defined (MD) signal over the network by the first modem, wherein the information signal is included in the MD signal.

6. The method of claim 3 further comprising:

receiving the information signal from the network by the first modem;

conditioning the first modem to transmit the test signal with the data over the network in response to the information signal received by the first modem indicating that the second modem is capable of comparing the test signal with the standard test signal.

7. The method of claim 1 wherein the retraining includes resetting a channel compensation module by the second modem.

8. The method of claim 7 wherein the resetting step further includes:

clearing a channel compensation buffer of a first set of channel compensation coefficients;

determining a second set of channel compensation coefficients; and storing the second set of channel coefficients in the channel compensation buffer.

9. The method of claim 7 wherein the channel compensation module is an echo canceller.

10. The method of claim 7 wherein the channel compensation module is an equalizer.

11. The method of claim 1 wherein the retraining mode includes resetting a channel compensation module by the first modem.

12. The method of claim 1 further comprising:

transmitting data over a network by the second modem, the data includes a second test signal;

receiving the second test signal from the network by the first modem;

comparing the second test signal received by the first modem to a second standard test signal; and selectively initiating the retraining as determined by the comparison.

13. The method of claim 1 further comprising:

encoding the data for transmission over a network.

14. The method of claim 13, wherein the data is encoded in compliance with the V.34 Specification.

15. The method of claim 13 wherein encoding the data for transmission over a network further includes mapping the data to points in a multi-dimensional constellation.

16. The method of claim 1 further comprising:

receiving the data from a computer by the first modem; and inserting the test signal in the data.

17. The method of claim 16 wherein inserting the test signal in the data includes inserting a series of bits in the data.

18. The method of claim 1 further comprising:

packing the data into frames by the first modem;

counting the number of frames; and wherein the comparison depends upon the result of the counting.

19. The method of claim 18 wherein the packing the data into frames includes inserting the test signal into one of a series of consecutive frames.

20. The method of claim 1 wherein the network is a telephone network.

21. The method of claim 1 further comprising:

transmitting an information signal over the network by the first modem, the information signal indicative that the first modem is capable of transmitting a test signal;

receiving the information signal from the network by the second modem; and wherein the first modem does not transmit the test signal with the data over the network if the first modem does not receive an indication from the second modem over the network that the second modem is capable of comparing the test signal with the standard test signal.

22. A communications device having start-up and data modes consistent with ITU-T Recommendation V.34, A Modem Operating At Data Signaling Rates Up To 28800 Bit/S For Use On The General Switched Telephone Network And On Leased Point-To-Point 2-Wire Telephone-Type Circuits (V.34 Specification), said device comprising:

a modem in a data mode for receiving signals from a network, wherein the signals contain a first plurality of data originating from a computer system coupled to the network, the signals also include a first test signal within the first plurality of data;

the modem further including:

a channel compensation module, the channel compensation module altering the signals received from the network to adjust for at least one condition of the network, the channel compensation module altering the signals as per a set of parameters; and wherein the set of parameters are reset as determined by a result of the modem comparing the first test signal to a standard test signal.

23. The communications device of claim 22, wherein the set of parameters are reset when the modem is not in the data mode.

24. The communications device of claim 22 wherein the first test signal being a sequence of bits.

25. The communications device of claim 22 wherein:

the first test signal is included within the first plurality of data at predetermined intervals.

26. The communications device of claim 22 wherein the first test signal is inserted into the first plurality of data by a second modem coupled between the computer system and the network.

27. The communications device of claim 22 further comprising:

a framer for receiving a second plurality of data from a second computer system, the framer inserting a second test signal into a second plurality of data.

28. The communications device of claim 27 wherein:

the framer inserts the second test signal into the second plurality of data at predetermined intervals.

29. The communications device of claim 28 further comprising:

a frame counter, wherein the framer packages the second plurality of data in frames, the frame counter counting the frames, the frame counter providing an indication signal indicative of a predetermined number of frames being counted, the framer inserting the second test signal into the second plurality of data as determined by the indication signal.

30. The communications device of claim 29 wherein the frame counter includes a controller.

31. The communications device of claim 27 further comprising:

an encoder, the encoder encoding the second plurality of data and second test signal into signals capable of being sent over a network.

32. The communications device of claim 31 wherein the encoder encodes the data as per the V.34 Specification.

33. The communications device of claim 31 further comprising:

a second channel compensation module for altering the signals capable of being sent over the network to adjust for at least one condition of the network, the second channel compensation module altering the signals as per a second set of parameters;

wherein the second set of parameters are reset as determined by a result of the modem comparing the first test signal to a standard test signal.

34. The communications device of claim 31 wherein the encoder includes a mapper for mapping the second plurality of data and second test signal.

35. The communications device of claim 27 wherein the modem sends an information signal over the network indicating that the modem is capable of inserting the second test signal into the second plurality of data.

36. The communications device of claim 35 wherein the information signal is sent during a start up procedure.

37. The communications device of claim 36 wherein the information signal is sent during a phase 3 of a startup procedure.

38. The communications device of claim 35 wherein the information signal is sent in a Manufacture Defined (MD) signal.

39. The communications device of claim 35 wherein the information signal further indicates the frequency at which the framer inserts the second test signal into the second plurality of data.

40. The communications device of claim 27 wherein the insertion of the second test signal with the second plurality of data is dependent upon a reception of an indication sent by a second modem during a startup procedure, the indication indicative of an ability of the second modem to compare the second test signal with a standard test signal.

41. The communications device of claim 27 wherein the encoder includes a constellation shaper.

42. The communications device of claim 22 where the channel compensation module is an echo canceller.

43. The communications device of claim 22 wherein:

the channel compensation module includes a buffer, the set of parameters being the coefficients stored within the buffer.

44. The communications device of claim 22 wherein the channel compensation module is an equalizer.

45. The communications device of claim 22 wherein:

the signals at a specified time contain an information signal, the specified time occurring when the modem is not in the data mode, the information signal indicative that the signal will contain the first test signal with the first plurality of data.

46. The communications device of claim 45 wherein the information signal is received during a start up procedure.

47. The communications device of claim 46 wherein the information signal is received during a phase 3 of the startup procedure.

48. The communications device of claim 45 wherein the information signal is received in a Manufacture Defined (MD) signal.

49. The communications device of claim 45 wherein the information signal further indicates the frequency at which the first test signal occurs in the received signal.

50. The communications device of claim 22 further comprising:

a controller, the controller comparing the first test signal to a standard test signal.

51. The communications device of claim 22 wherein:

the set of parameters are reset in response to the modem receiving a reset signal from the network.

52. The communications device of claim 22 wherein the network is a telephone network.

* * * * *